(12) United States Patent
Palaiah et al.

(10) Patent No.: US 11,216,341 B2
(45) Date of Patent: *Jan. 4, 2022

(54) METHODS AND SYSTEMS FOR PROTECTING DATABASES OF A DATABASE AVAILABILITY GROUP

(71) Applicant: NETAPP, INC., Sunnyvale, CA (US)

(72) Inventors: Balamurali Palaiah, Gilroy, CA (US);
Vineeth Karinta, Fremont, CA (US);
Kavish Pahade, San Jose, CA (US);
Grace Zhanglei Wu, Sunnyvale, CA (US)

(73) Assignee: NETAPP, INC., San Jose, CA (US)

( * ) Notice: Subject to any disclaimer, the term of this patent is extended or adjusted under 35 U.S.C. 154(b) by 15 days.

This patent is subject to a terminal disclaimer.

(21) Appl. No.: 16/904,362

(22) Filed: Jun. 17, 2020

(65) Prior Publication Data

US 2020/0327013 A1 Oct. 15, 2020

Related U.S. Application Data

(63) Continuation of application No. 16/381,538, filed on Apr. 11, 2019, now Pat. No. 10,725,866.

(51) Int. Cl.
| | |
|---|---|
| *G06F 11/14* | (2006.01) |
| *G06F 9/455* | (2018.01) |
| *G06F 16/907* | (2019.01) |
| *G06F 3/06* | (2006.01) |
| *G06F 16/17* | (2019.01) |

(52) U.S. Cl.
CPC .......... *G06F 11/1435* (2013.01); *G06F 3/065* (2013.01); *G06F 3/067* (2013.01); *G06F 3/0616* (2013.01); *G06F 9/45558* (2013.01); *G06F 11/1448* (2013.01); *G06F 11/1458* (2013.01);

(Continued)

(58) Field of Classification Search
None
See application file for complete search history.

(56) References Cited

U.S. PATENT DOCUMENTS

2006/0218210 A1 9/2006 Sarma et al.
2014/0317368 A1 10/2014 Li et al.

OTHER PUBLICATIONS

Flynn; SnapManager® 4.0 for Microsoft® Exchange Best Practice Guide;NetApp; Jan. 2007.

(Continued)

*Primary Examiner* — Charles Rones
*Assistant Examiner* — Han V Doan
(74) *Attorney, Agent, or Firm* — Klein, O'Neill & Singh, LLP

(57) ABSTRACT

Methods and systems for storage services is provided. One method includes configuring by a processor, a database availability group (DAG) storing an active database copy at a first computing node and a passive database copy of the active database copy at a second computing node; initiating a backup operation for backing up the passive database copy from the second computing node; and interfacing with the first computing node by the second computing node for completing the backup operation. The first computing node identifies logs for the backup operation, backs up the identified logs and provides metadata associated with the backup of the identified logs to the second computing node. The second computing node updates metadata for the backup operation such that a backup copy of the passive database copy points to the second node with metadata received from the first computing node.

20 Claims, 10 Drawing Sheets

(52) U.S. Cl.
CPC ........ G06F 16/1734 (2019.01); G06F 16/907 (2019.01)

(56) References Cited

OTHER PUBLICATIONS

"SnapCenter® Software 4.0 Concepts Guide", NetApp; May 2018.
"SnapManager® 6.1 for Microsoft® Exchange Server Installation andAdministration Guide"; NetApp; Feb. 2014.

METHODS AND SYSTEMS FOR PROTECTING DATABASES OF A DATABASE AVAILABILITY GROUP

This patent application claims priority of and is a continuation of U.S. patent application Ser. No. 16/381,538, filed on Apr. 11, 2019, and now U.S. Pat. No. 10,725,866, the disclosure of which is incorporated herein by reference in its entirety.

TECHNICAL FIELD

The present disclosure relates to storage systems and more particularly to, protecting databases of a database availability group (DAG).

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple users with access to shared data, backing up data and others.

A storage system typically includes at least one computing system executing a storage operating system for storing and retrieving data on behalf of one or more client computing systems ("clients"). The storage operating system stores and manages shared data containers in a set of mass storage devices.

Storage systems are being used extensively by different applications, for example, electronic mail (email) servers, database applications, virtual machines executed within virtual machine environments (for example, a hypervisor operating environment) and others to store data, protect the data using backups.

Databases may be stored in a DAG, where an active copy of a database is stored by one computing device (or node), while replicas of the database are stored in multiple nodes of the DAG. The replicas may be used to take over the active copy, if the active copy becomes unavailable or useable due to corruption.

In conventional DAGs, all database replicas are typically backed up, while the backup process is tied to the node that hosts a specific replica. This may be referred to as "host affinity" for taking backups. This approach is inefficient because backing up all database replicas wastes storage space. Furthermore, backing up an active, production copy of a database may affect the performance of the production copy because requests to access the database may not get processed efficiently while the production copy is being backed up. Continuous efforts are being made to develop technology for providing better storage services for databases operating in DAGs.

BRIEF DESCRIPTION OF THE DRAWINGS

The foregoing features and other features will now be described with reference to the drawings of the various aspects of the present disclosure. In the drawings, the same components have the same reference numerals. The illustrated aspects are intended to illustrate, but not to limit the present disclosure. The drawings include the following Figures.

DETAILED DESCRIPTION

As preliminary note, the terms "component", "module", "system," and the like as used herein are intended to refer to a computer-related entity, either software-executing general purpose processor, hardware, firmware and a combination thereof. For example, a component may be, but is not limited to being, a process running on a processor, a hardware based processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

In one aspect, methods and systems for storage services is provided. One method includes configuring by a processor, a database availability group (DAG) storing an active database copy at a first computing node and a passive database copy of the active database copy at a second computing node; initiating a backup operation for backing up the passive database copy from the second computing node; and interfacing with the first computing node by the second computing node for completing the backup operation. The first computing node identifies logs for the backup operation, backs up the identified logs and provides metadata associated with the backup of the identified logs to the second computing node. The second computing node updates metadata for the backup operation such that a backup copy of the passive database copy points to the second node with metadata received from the first computing node.

Figure 1A:
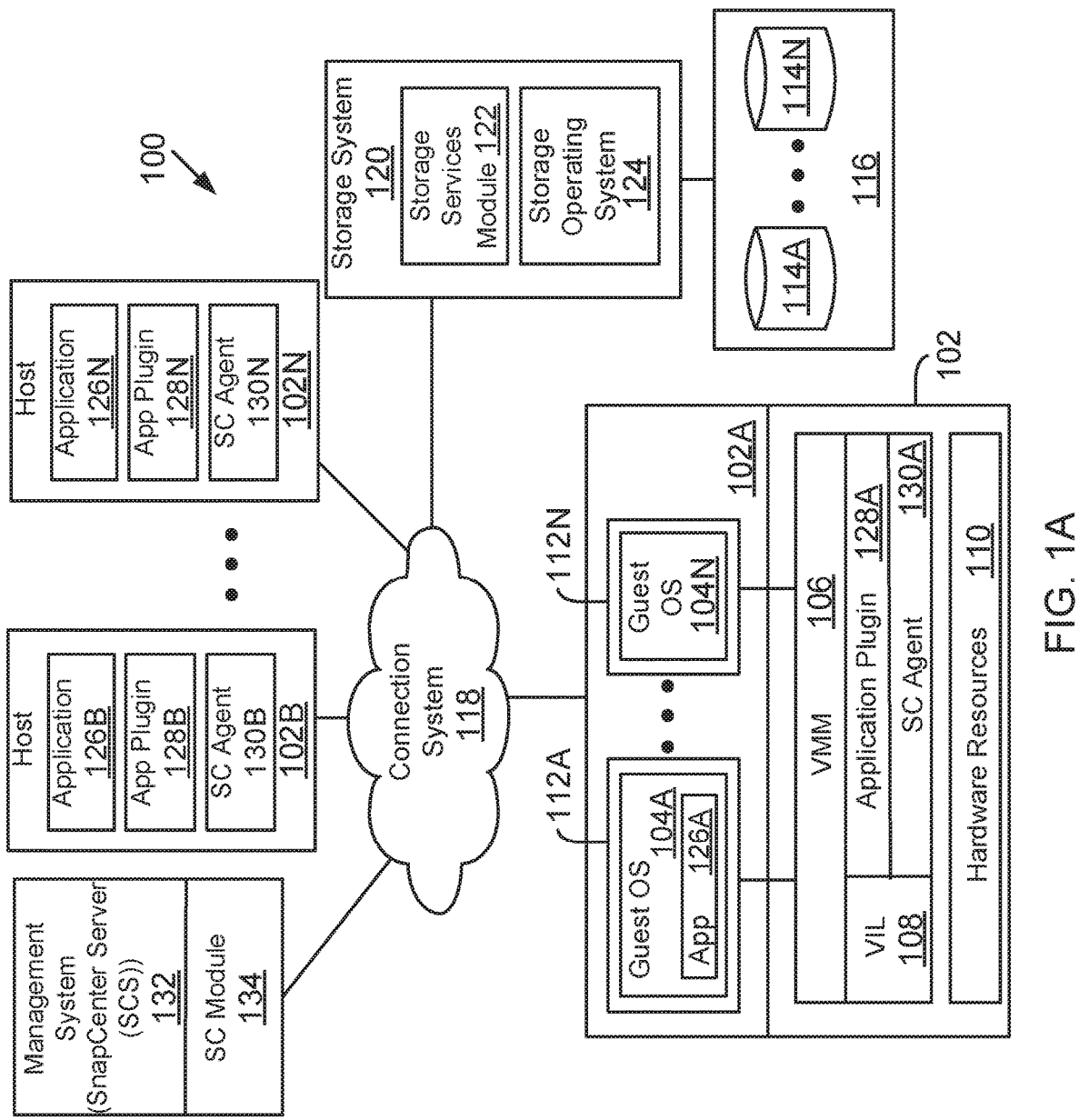
FIG. 1A shows an example of an operating environment for the various aspects disclosed herein.

System 100: FIG. 1A shows an example of a system 100, where the various adaptive aspects disclosed herein may be implemented. In one aspect, system 100 includes at least a host computing system 102 (shown as host systems 102A-102N and may also be referred to as a host platform 102 or simply as server 102) communicably coupled to a storage system 120 executing a storage operating system 124 via a connection system 118 such as a local area network (LAN), wide area network (WAN), the Internet and others. As described herein, the term "communicably coupled" may refer to a direct connection, a network connection, or other connections to enable communication between computing and network devices.

System 100 also includes a management system (may also be referred to as "Snapcenter Server" or "SCS" (without derogation of any trademark rights of NetApp Inc., the assignee of the present application) 132 that executes instructions for a management module (or application) (may be referred to as SnapCenter module (or "SC module" or "SCM") 134 for coordinating storage services related operations (for example, backups, restore, cloning and other operations) for different applications and plugins. Although SCS 132 is shown as a stand-alone module, it may be implemented with other applications, for example, within a virtual machine environment, as described below.

It is also noteworthy that SCS 132 is referred to herein as a SnapCenter server only as an example, and may be referred to or described using different terminology (for example, a central snap server, a central storage services provider, snap manager server and other descriptive terms). The various aspects described herein are of course not limited by how SCS 132 is categorized or the terminology used to describe its innovative functionality, described below in more detail. Furthermore, SCS 132 and the SC module 134 may be referred to interchangeably throughout this specification.

In one aspect, host systems 102 may execute a plurality of applications 126A-126N, for example, an email server (Exchange server), a database application (for example, SQL database application, Oracle database application and others) and others. These applications may be executed in different operating environments, for example, a virtual machine environment (described below), Windows, Solaris, Unix and others. The applications may use storage system 120 to store information at storage devices 114 in a storage sub-system 116.

To protect information associated with each application, a plugin module (shown as application plugins 128A-128N) are provided. The term plugin as used in this application means a hardware processor executable layer that is customized to interface with specific applications, as described below in detail. The term protect means to backup an application and/or backup associated information (including configuration information, data (files, directories, structured or unstructured data) and others (may jointly be referred to as data containers)).

Each host system also executes an agent 130A-130N (may be referred to as SMcore or SC agent 130) that interfaces with SCS 132 and the various application plugins for managing backups, restore, cloning and other operations, as described below in detail.

In one aspect, the storage system 120 has access to a set of mass storage devices 114A-114N (may be referred to as storage devices 114) within at least one storage subsystem 116. The storage devices 114 may include writable storage device media such as magnetic disks, video tape, optical, DVD, magnetic tape, non-volatile memory devices for example, self-encrypting drives, flash memory devices and any other similar media adapted to store structured or non-structured data. The storage devices 114 may be organized as one or more groups of Redundant Array of Independent (or Inexpensive) Disks (RAID). The various aspects disclosed are not limited to any particular storage device or storage device configuration.

The storage system 120 provides a set of storage volumes to the host systems 102 via connection system 118. The storage operating system 124 can present or export data stored at storage devices 114 as a volume (or logical unit number (LUN)). Each volume may be configured to store data files (or data containers or data objects), scripts, word processing documents, executable programs, and any other type of structured or unstructured data. From the perspective of one of the client systems, each volume can appear to be a single storage drive. However, each volume can represent the storage space in one storage device, an aggregate of some or all of the storage space in multiple storage devices, a RAID group, or any other suitable set of storage space. An aggregate is typically managed by a storage operating system 124 and identified by a unique identifier (not shown). It is noteworthy that the term "disk" as used herein is intended to mean any persistent storage device/space and not to limit the adaptive aspects to any particular type of storage device, for example, hard disks.

The storage system 120 may be used to store and manage information at storage devices 114 based on a request generated by an application executed by a host system or any other entity. The request may be based on file-based access protocols, for example, the Common Internet File System (CIFS) protocol or Network File System (NFS) protocol, over the Transmission Control Protocol/Internet Protocol (TCP/IP). Alternatively, the request may use block-based access protocols, for example, the Small Computer Systems Interface (SCSI) protocol encapsulated over TCP (iSCSI) and SCSI encapsulated over Fibre Channel (FC).

In a typical mode of operation, one or more input/output (I/O) commands, such as an NFS or CIFS request, is sent over connection system 118 to the storage system 120. Storage system 120 receives the request, issues one or more I/O commands to storage devices 114 to read or write the data on behalf of the client system, and issues an NFS or CIFS response containing the requested data over the network 118 to the respective client system.

Although storage system 120 is shown as a stand-alone system, i.e. a non-cluster based system, in another aspect, storage system 120 may have a distributed architecture; for example, a cluster based system that may include a separate network module and storage module. Briefly, the network module is used to communicate with host platforms 102, while the storage module is used to communicate with the storage devices 114, as described below with respect to FIG. 2A.

Alternatively, storage system 120 may have an integrated architecture, where the network and data components are included within a single chassis. The storage system 120 further may be coupled through a switching fabric to other similar storage systems (not shown) which have their own local storage subsystems. In this way, all of the storage subsystems can form a single storage pool, to which any client of any of the storage servers has access.

Storage system 120 also executes or includes a storage services module 122 that coordinates storage volume backups, cloning, restore and replication for different hosts and different applications. Although storage services module 122 is shown as a single block, it may include various modules to taking backups, cloning restore operations, replicating backups from one location to another and so forth. As described below, backups and other operations may be performed using SCS 132 and SC module 134. As an example, taking backups may include taking snapshots, i.e. a point-in-time copy of a storage volume. The point-in-time copy captures all the information in a storage volume. The snapshot may be used to restore a storage volume at any given time.

Storage system 120 also protects snapshots by replicating snapshots stored at a first storage system (may be referred to as primary storage) and replicating it to a secondary storage source. Different technologies, including the SnapVault and SnapMirror technologies of NetApp Inc. (without derogation of any trademark rights of NetApp Inc.) may be used to protect storage volumes.

SnapVault is primarily intended for disk-to-disk backups. SnapVault leverages NetApp Snapshot technology to back up and restore systems at a block level. SnapVault identifies and copies only the changed blocks of a system to secondary storage. SnapMirror takes a mirror copy of a storage volume and stores it at a remote location/disaster recovery site. SnapMirror can occur either at volume level or at a Qtree level. The various techniques described herein are not limited to any specific replication/protection technology.

One or more of the host systems (for example, 102A) may execute a virtual machine environment where a physical resource is time-shared among a plurality of independently operating processor executable virtual machines (also referred to as VMs). Each VM may function as a self-contained platform, running its own operating system (OS) and computer executable, application software. The computer executable instructions running in a VM may be collectively referred to herein as "guest software." In addition, resources available within the VM may be referred to herein as "guest resources."

The guest software expects to operate as if it were running on a dedicated computer rather than in a VM. That is, the guest software expects to control various events and have access to hardware resources on a physical computing system (may also be referred to as a host platform) which may be referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host platform.

Host platform 102A provides a processor executable virtual machine environment executing a plurality of VMs 112A-112N. VMs 112A-112N that execute a plurality of guest OS 104A-104N (may also be referred to as guest OS 104) that share hardware resources 110. As described above, hardware resources 110 may include CPU, memory, I/O devices, storage or any other hardware resource.

In one aspect, host platform 102A may also include a virtual machine monitor (VMM) 106, for example, a processor executed hypervisor layer provided by VMWare Inc., Hyper-V layer provided by Microsoft Corporation of Redmond, Wash. or any other layer type. VMM 106 presents and manages the plurality of guest OS 104A-104N executed by the host platform 102A.

In one aspect, VMM 106 is executed by host platform 102A with VMs 112A-112N. In another aspect, VMM 106 may be executed by an independent stand-alone computing system, often referred to as a hypervisor server or VMM server and VMs 112A-112N are presented on another computing system.

It is noteworthy that various vendors provide virtualization environments, for example, VMware Corporation, Microsoft Corporation and others (without derogation of any third party trademark rights). The generic virtualization environment described above with respect to FIG. 1A may be customized depending on the virtual environment provider.

VMM 106 may include or interface with a virtualization layer (VIL) 108 that provides one or more virtualized hardware resource 110 to each OS 104A-104N. VMM 106 also includes or interfaces with a hypervisor plugin (shown as application plugin 128A) and the SC agent 130A.

Figure 1B:
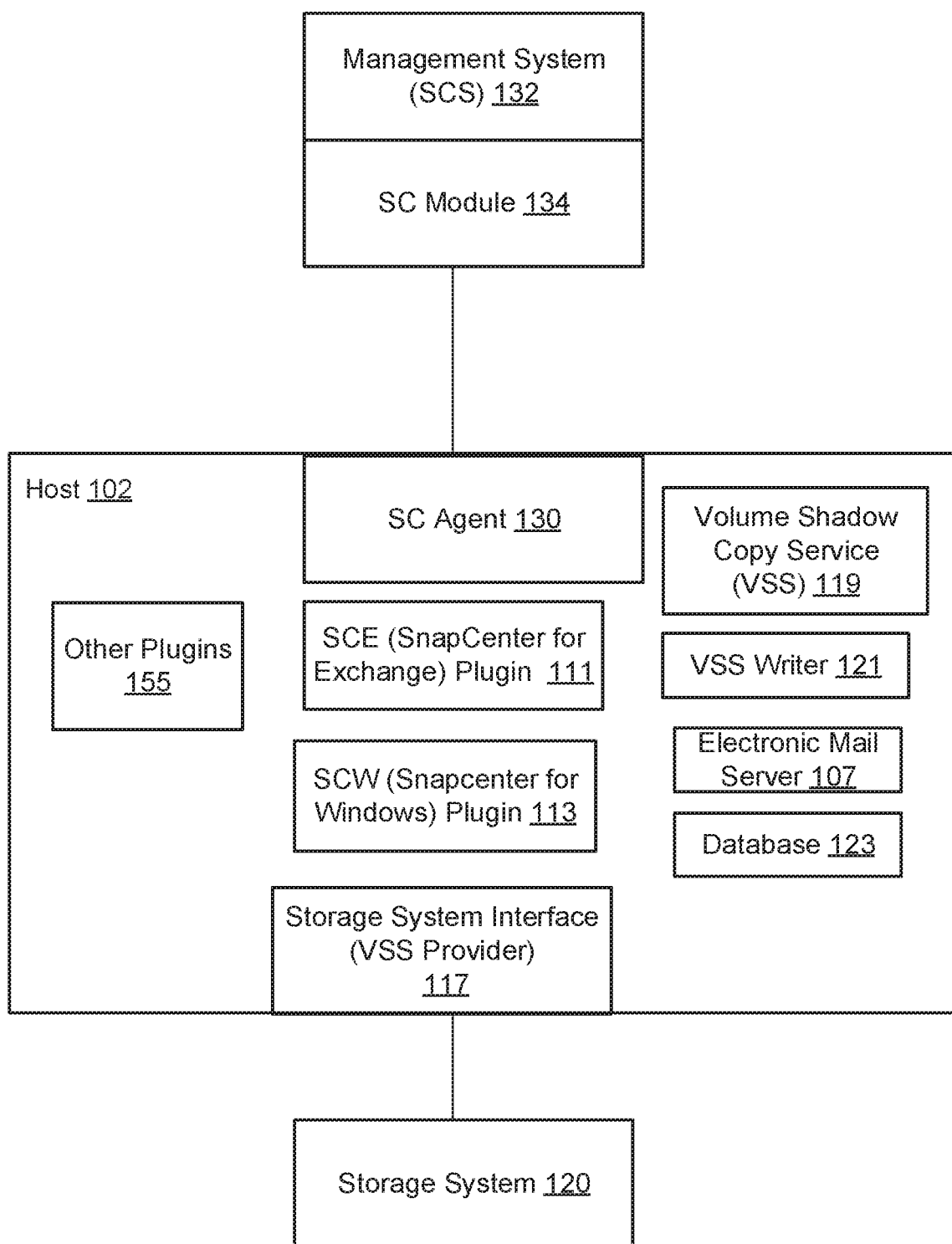
FIG. 1B shows an example of a host system executing a plurality of plugins, according to one aspect of the present disclosure.

FIG. 1B shows an example of a portion of the system 100, described above with respect to FIG. 1A. In aspect, host 102 is part of a database availability group (DAG), described below with respect to FIG. 1C. As an example, host 102 executes an electronic mail server application 107 and the data for application 107 is stored in a database 123. As an example, application 107 may be a Microsoft Exchange server [without derogation of any trademark rights) and the database 123 may be an active copy of a DAG. It is noteworthy that although the example of FIG. 1B is based on Exchange, the adaptive aspects are not limited to Exchange or any other application type.

In one aspect, SC agent 130 interfaces with the SC module 134 via a network connection. The SC agent 130 receives requests for backup and provides the request to a SC Exchange (SCE) plugin 111. The SCE plugin 111 is customized for application 107 and interfaces with application 107 to perform electronic mail related specific portions of discovery, backup and restore operations. It is noteworthy that the host 102 may also execute other plugins 155, besides plugins 111 and 113 (described below).

As an example, host 102 executes a Windows based operating system (without derogation to any trademark rights). A plugin, SCW (Snapcenter for Windows) 113 is provided for exposing application programming interfaces (APIs) for a Volume Shadow Copy Service (VSS) 119 that is provided by the Windows operating system. VSS 119 provides host based technology that allows taking manual or automatic backup copies or snapshots of computer files or volumes that are used by applications, e.g. 107 for database 123. VSS 119 includes a software layer, led the VSS provider service that assists in a "Shadow Copy" technology to createbackups or shadow copies. The VSS provider uses the NTFS (New Technology File System) to create the backups. As part of the VSS service, the operating system uses a VSS writer 121 to interface with application 107. The VSS writer 121 communicates with application 107 to make sure that a consistent database state is being for a backup.

At a high-level, to use the VSS 119, a VSS requester, e.g. the SCE plugin 111 (or a module within SC agent 130) sends a request to start a backup process. The VSS writer 121 "freezes" or quiesce's the database 123 making sure that it is in a consistent state. The storage system 120 creates a snapshot of the data. The storage system 120 is accessed using a storage system interface 117 (may also be referred to as the VSS provider). The VSS writer 121 is notified once the backup is complete so that the database 123 can be accessed. Details of executing a backup and restore operation are provided below with respect to FIGS. 1D and 1E, respectively.

Figure 1C:
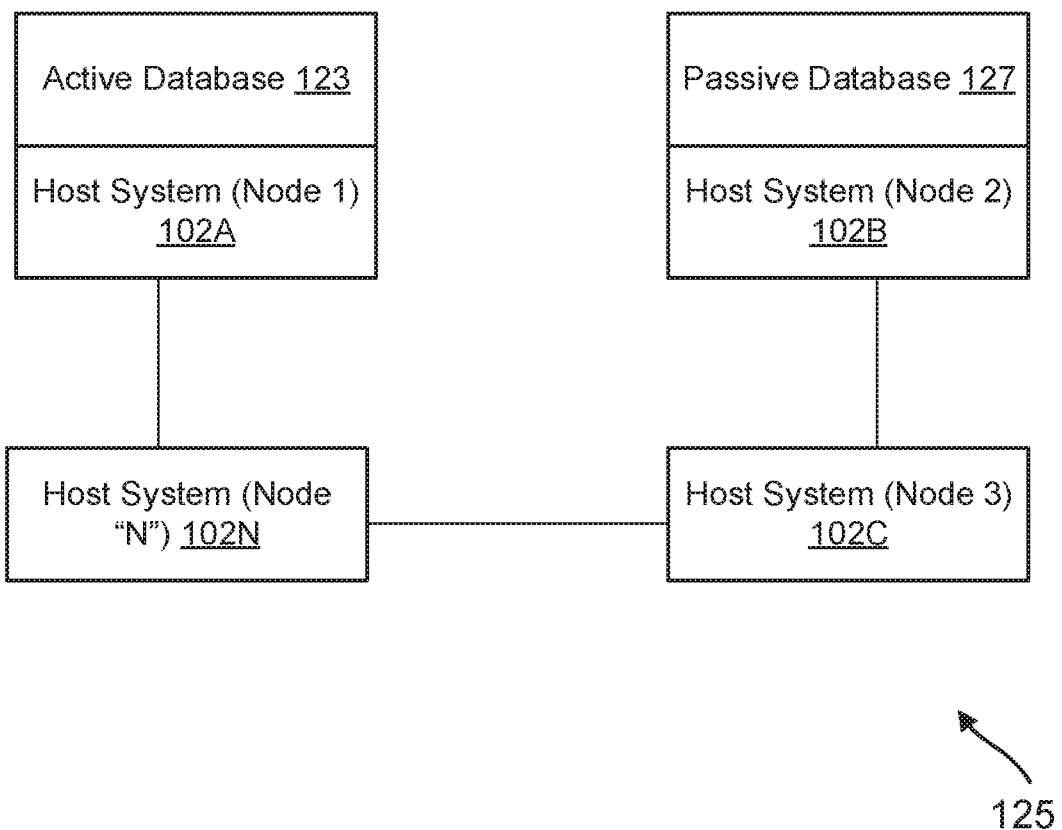
FIG. 1C shows an example of a database availability group (DAG)

FIG. 1C shows an example of a DAG 125 having a plurality of host systems (or nodes shown as 102A-102N). Node 1 102A hosts the active database 123, while node 2 102B host a passive copy 127.

In conventional systems, multiple passive copies are stored within DAG 125. The adaptive aspects of the present disclosure overcome these shortcomings by only have a single passive copy and using that for backup/restore operations, as described below in detail.

Figure 1D:
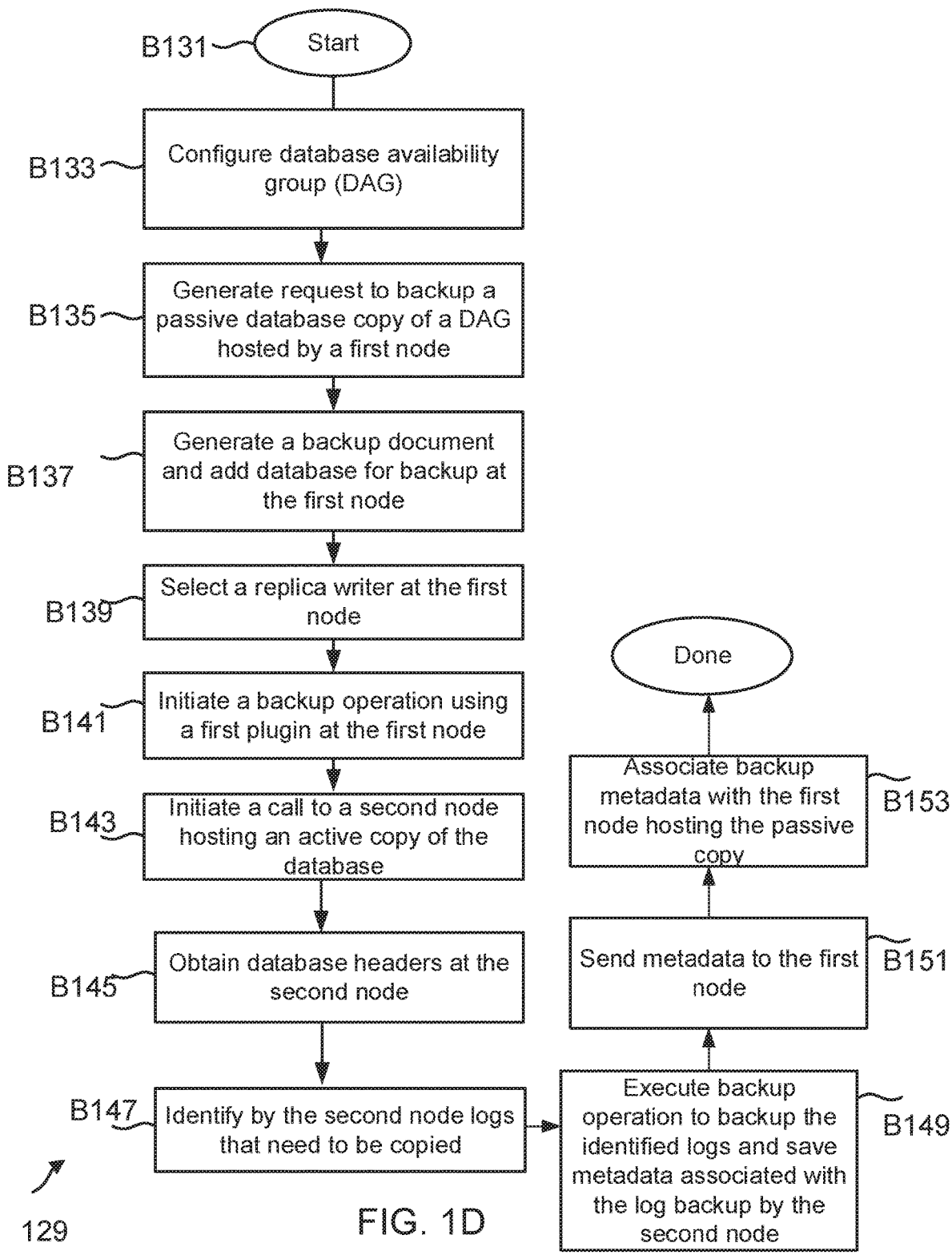
FIG. 1D shows a process for taking a backup of a passive database in a DAG, according to one aspect of the present disclosure.

Process Flows: FIG. 1D shows a process 129, according to one aspect of the present disclosure. The process blocks of process 129 are executed using one or more computing devices. The process blocks may be executed using processor executable instructions executed within a virtual machine. Process 129 begins in block B131, when the storage system 120, SCS 132 and host 102 have been initialized and are operational.

In block B133, DAG 125 is configured. In one aspect, DAG 125 is configured using a policy object that defines a protection policy for the database 123. The protection policy indicates that a backup can be taken for a passive node, which breaks the "host affinity" of conventional systems. This enables the system to take backup regardless of which node of the DAG is hosting the active copy at any given time. The protection policy also indicates when a backup needs to be taken, number of passive copies that are to be maintained (for example, 1 passive copy), the type of backup that needs to be taken (e.g. whether all transaction logs have to be backed up, whether logs truncated by application 107 are to be backed up or any other parameter). The protection policy object for DAG 125 is stored at a storage device and accessible to the SC module 134, as well as the modules of host 102 described above with respect to FIG. 1B.

In block B135, a request to backup a passive copy (e.g. 127, FIG. 1C) of the active database 123 is generated. As an example, node 1 102A hosts the active database and node 2 102B hosts the passive database 127, when the request is generated. The request may be generated by the SC module 134 interfacing with the SC agent 130 at node 2 102B. The request is provided to the SCE plugin 111 interfacing with VSS 119.

In block B137, the VSS 119 at node 2 102B starts a backup workflow and creates a backup document. The passive database 127 is added to the backup document for the backup.

In block B139, the VSS writer 121 is selected by VSS 119 to interface with database 127.

In block B141, the database backup is initiated by the SCE plugin 111. Using storage system interface 117, the LUNs/volumes associated with the passive database 127 at storage system 120 are backed up by taking a snapshot.

In block B143, a call is initiated to node 1 102A that hosts the active database 123 by SC agent 130. The call requests log information from node 1 102A for the backup operation, since node 1 102A hosts the active database 123.

In block B145, the VSS 119 executed at node 1, obtains the database headers and performs checkpoint and obtains the highest and lowest log sequence numbers for database 123. In block B147, the VSS 119 at node 1 102A determines the logs that need to be backed up. This may be based on the log sequence numbers. Thereafter, a backup of the logs is taken in block B149 by node 1 102A. The backup at the storage system 120 is initiated by the storage system interface 117. In one aspect, the log backup is copy-less using NTFS hard links and includes a snapshot of the volume/LUN where the logs for database 123 are stored. The metadata for the log backup is also recorded and stored. The log backup metadata includes VSS metadata and the storage system related metadata. For example, the log metadata includes a backup identifier, backup size, backup type, application that owns the backup (i.e. 107), time the backup was taken, backup policy identifier that identifies a backup policy object, or any other information. Once the log backup is complete, VSS 119 of node 1 102A truncates logs that have been committed to persistent storage at storage system 120.

In block B151, the log backup metadata is sent to node 2 102B by node 1 102A via a network connection. In block B153, node 2 102B updates the received metadata such that the log backup metadata points to node 2 102B, indicating that the backup is based on the passive database 127. Thereafter, the application 107/database 127 is un-quiesced by the VSS writer 121 and the process is completed.

Figure 1E:
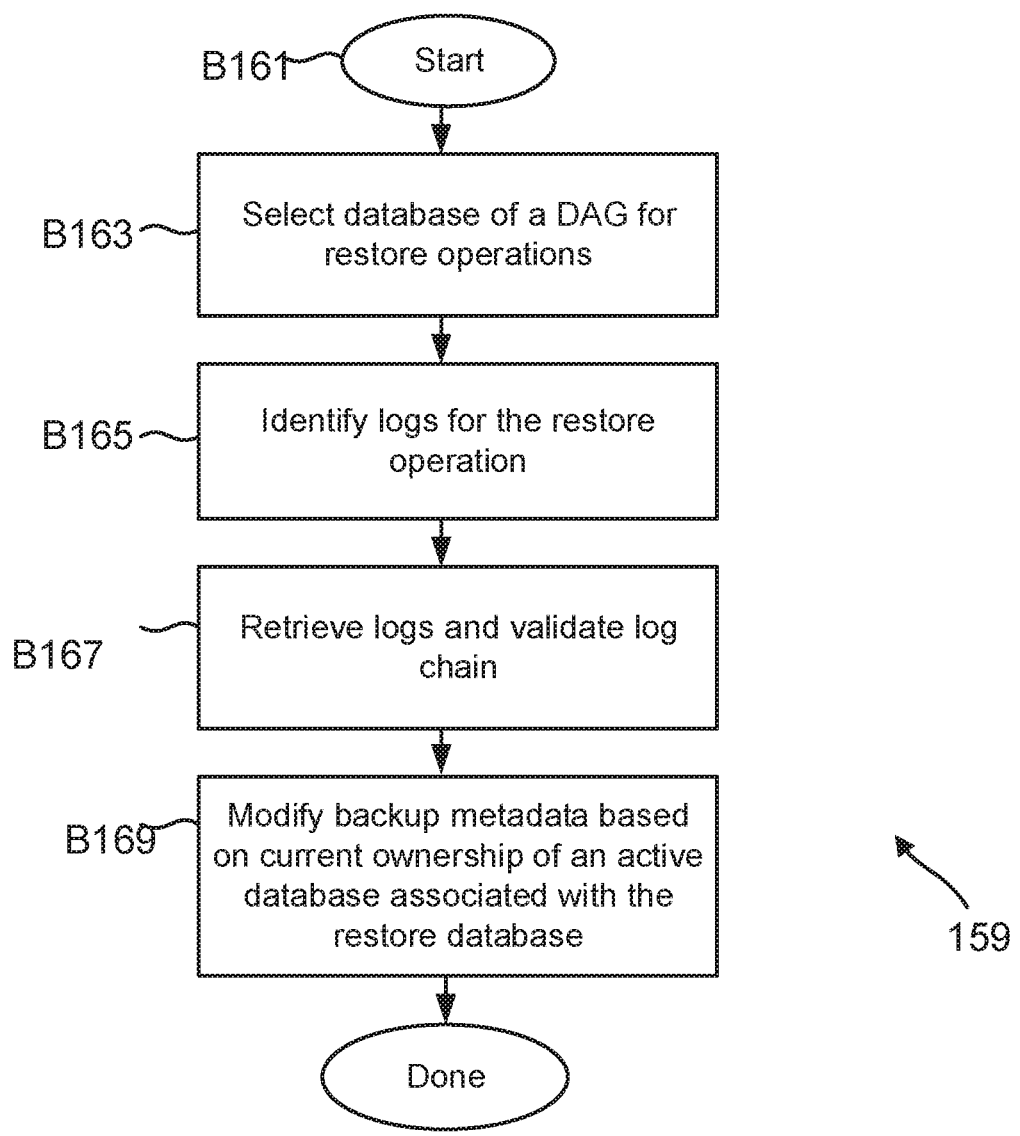
FIG. 1E shows a process for restoring a database in a DAG using the backup of the passive database, according to one aspect of the present disclosure.

FIG. 1E shows a process 159 to restore a backup in DAG 125, according to one aspect of the present disclosure. The process begins in block B161 after one or more backups using the process flow of FIG. 1D have been taken. In block B163, a database is selected for a restore operation. The database may be selected based on user input via a user interface.

In block B165, the logs for the restore operation are identified. The logs may be identified by evaluating the database headers. In one aspect, the VSS 119 provides the log information to SCE plugin 111. The SCE plugin 111 interfaces with storage system interface 117 to identify the log backups stored by storage system 120.

In block B167, the logs are retrieved and a validation step for the restore is executed by SCE agent 130 (backup verification module 197 (FIG. 1G)). The validation is performed to ensure that all logs for the restore operation are available and can be reconstructed.

In block B169, the VSS metadata is updated to reflect the current ownership of the active database associated with the backup database. This ensures that the restore database is at the current node that owns or hosts the active database. Thereafter, the database is restored and mounted at the active node.

In one aspect, only a single passive copy is backed up in DAG 125. This conserves storage space compared to conventional systems where multiple passive copies are backed up. Furthermore, the backup is not tied to the active database node and instead may be located at any node of the DAG. This breaks the inefficient host affinity of the conventional systems.

Figure 1F:
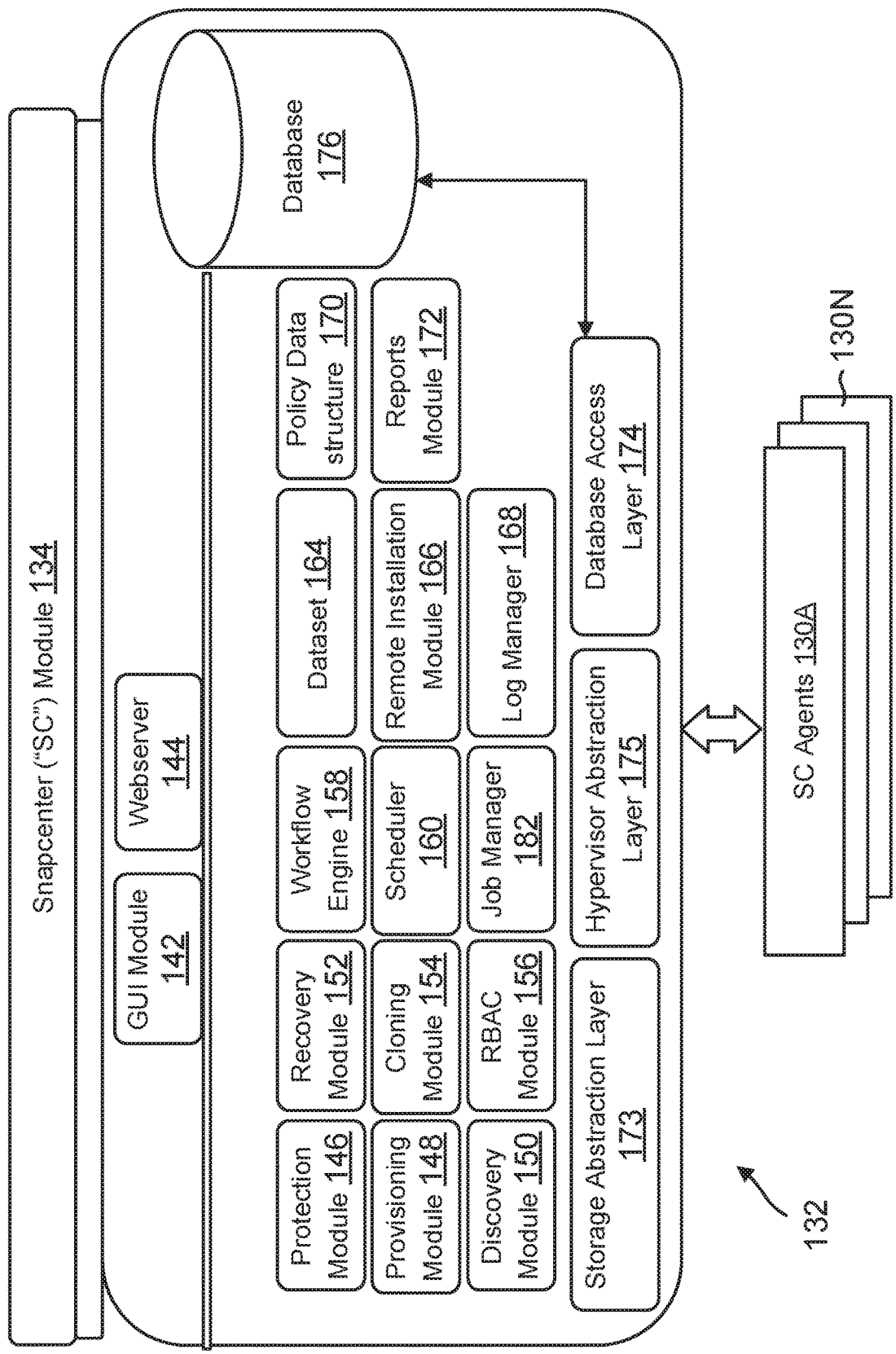
FIG. 1F shows a block diagram of a management module, according to one aspect of the present disclosure.

SCS 132: FIG. 1F shows a block-level diagram of SCS 132 having the SC module 134, according to one aspect of the present disclosure. The SC module 134 may be executed by a stand-alone system or may interface or is integrated with another management console/application to manage and interface with multiple instances of SC agents' 130A-130N.SC module 134 may also be implemented as an application within a VM environment.

The SC module 134 includes a graphical user interface (GUI) module 142 that presents a GUI at a display device, for example, a monitor, a smart phone, tablet or any other display device type. The GUIs may be used by different users to interface with SCS 132 and its components, for example to backup database 127, as described above. It is noteworthy that the various aspects described herein are not limited to any specific GUI type because a command line interface (CLI) may also be used to implement the adaptive aspects described herein.

The SC module 134 may also include a web server 144 for enabling Internet based communication. As an example, web server 144 may be implemented as an Internet Information Services (IIS) for a Windows® Server web server (without derogation of any third party trademark rights). The web server 144 interfaces with a workflow engine 158 that coordinates and manages various tasks that are performed by the different components of the SC module 134.

In one aspect, the workflow engine 158 coordinates dataset 164 creation, policy allocation and manage a database 176 (different from the database 123/127, described above). The workflow engine 158 also communicates with various SC agents 130A-130N for host system related operations including backing up database 127.

In one aspect, the SC module 134 also includes a protection module 146, a provisioning module 148, a discovery module 150, a recovery module 152, a cloning module 154, a role based access control (RBAC) module 156, a storage abstraction layer (may also be referred to as "SAL") 173, a hypervisor abstraction layer (may also be referred to as "HAL") 175, a scheduler 160, a job manager 182, a remote installation module 166, a log manager 168, a policy data structure 170, a reports module 172 and a database access layer 174 that can access the database (or any other data structure type) 176. The database 176 stores various data structures (or objects) in a format that allows SC module 134 to handle storage services for different applications/host systems.

The log manager 168 collects logs from SC agents and the various plugins. The logs can then be presented to a user via a GUI. The logs may be for event management and audit for various SCS 132 operations. The logs may be collected for a job based on a job identifier.

The protection module 146 is used to enforce a policy for a particular storage services related job (for example, a backup operation in DAG 125 described above). The protection module 146 maintains a protection policy for a plurality of objects (or protection group) that are to be backed up and provides protection service for backing up the protection group objects. Based on an application object, a call is made to an appropriate plugin for providing the appropriate protection service.

In one aspect, protection module 146 maintains protection group objects for abstract representation of a container of application objects where protection of application objects is defined by policy objects. The protection group objects map to dataset objects 164.

The provisioning module 148 allows a user to configure and provision a LUN/volume (used interchangeably) that may be used to store information. The provisioning module 148 allows a user to set a LUN size and appropriate permissions for using the LUN, for example, reading and writing data, permission for changing a LUN size, deleting a LUN and other operations. Storage volume information is saved in a standard format at database 176 and includes, name of the storage volume, storage connection identifier (described below), size, a junction path, date volume was created and an aggregate.

The discovery module 150 interfaces with the SC agents 130A-130N executed at different host systems to obtain information regarding the host systems, storage resources used by various applications and information regarding data containers that are protected (i.e. backed up) and unprotected. The discovery module 150 also facilitates discovery and management of application specific objects, for example, VMs, databases, hypervisor and others. Based on the application type, an appropriate plugin is used to discover different objects.

In one aspect, the discovery module 150 initiates a discovery operation with the SC agents. An application programming interface (API) presented by the SCS 132 determines if a SC agent is installed at a host. If the SC agent is installed, then the SC agent discovers the various plugins at that host. If the SC agent is not installed, then it is installed by the remote installation module 166 and the appropriate plugins are installed as well.

The cloning module 154 is used to clone storage volumes that are maintained by the storage system 120. The cloning module 154 is also used for managing the life cycle of a clone. The term clone as used herein is a duplicate copy of a snapshot. The term clone life cycle management means generating a clone, refreshing a clone and deleting a clone based on user defined policies and requirements. Refreshing a clone means deleting an existing clone, generating a new snapshot and then creating the clone again.

The RBAC module 156 stores information regarding different clients/entities that are given access to storage. For example, a particular business unit may be allowed to read certain storage volumes and may not be allowed to backup, clone, replicate or delete any storage volumes. The RBAC module 156 manages the various roles and access type for different applications that may be executed in different host systems/computing environments.

In one aspect, RBAC module 156 includes an authentication and authorization module. User authentication may happen at multiple end points, for example, via a GUI login, a login API for clients or plugins and others. The authentication module authenticates users against different domain/subsystem requirements, for example, an Active Directory, a local Windows machine host system, open LDAP (lightweight directory protocol) and others. Once a user is authenticated, an encrypted token is generated based on user information. In another aspect, a hash token is generated based on the generated token. The hashed token is saved at database 176. The hashed token may be based on MD5 (Message Digest Algorithm, 5, SHA (secure hash algorithm)-1 or any other technique.

When the authenticated user logs back in, the user passes the token and the SCS 132 decrypts the token, validates the token and regenerates the hash value. The hash value is compared with the stored hash value in database 176.

In one aspect, the authorization module of the RBAC module 156 creates custom roles (for example, a SCS administrator, backup administrator, backup operator, backup viewer, restore administrator and others), modifies existing roles, assigns and unassigns permissions to and from a role (for example, a dataset, policy, host, storage connection, a dashboard, a report, discovery, remote installation and others), assigns and unassigns users to roles and assigns and unassigns resources (for example, hosts, datasets, policy and others).

In one aspect, roles determine a set of capabilities that are available to members of the role. For example, a backup administrator may be allowed to add a host system, install plugins, create a dataset, create a backup dataset, delete a dataset, create policies, delete backups, restore applications and others. A backup operator may be allowed to start and stop existing dataset jobs, monitor backups, view backup reports and perform application level restore operations. A backup viewer may be given read only access to backups, view existing backups and review job session details. A restore administrator may be allowed to perform restore operations using existing backups. The adaptive aspects described herein are not limited to these roles.

All the tasks conducted by the SC module 134 are organized and monitored by the job manager 182. The job schedules are managed by the scheduler 160. When a new job arrives (e.g. to take a backup of database 127), the job manager 182 stores the job information in a database (for example, 176) with other existing jobs. The job manager 182 creates sub-tasks for executing the appropriate work flows. The sub-tasks depend on the nature of the job (for example, backup, restore, cloning or others). The job manager 182 updates the status of each task to provide real-time updates via a GUI.

In one aspect, the policy data structure 170 is used to store polices for different stored objects (for example, databases in DAG 125, data structures, VMs, storage volumes and others). The policy information is configurable and may be changed by a user. In one aspect, the policy data structure 170 format is the same across different applications. This enables SC module 134 to manage storage services across different platforms with different requirements and operating parameters. The policy data structure 170 includes various policy objects to store various policies each with a set of attributes that can be applied to any dataset. The policy object stores a policy identifier, a policy name, description, a backup schedule policy, a retention count as to how long a backup is to be retained, a replication policy to replicate a backup from one location to another, types of backups, application consistent backups, and verification policies to verify a backup and others. It is noteworthy that a policy object may be shared across multiple datasets for multiple applications/plugins.

The reports module 172 is used to provide reports to users. The reports may be for different applications and in different formats.

In one aspect, the SC module 134 maintains the dataset 164 for different applications and application objects, including database 123/127. Each dataset is uniquely identified and named. The dataset format for managing replication for different applications is the same, regardless of how the applications handle information. A dataset may be associated with a policy data structure that defines how an object is to be protected. The dataset format used by the various aspects of the present disclosure allows a user to add or remove stored objects that need to be protected.

In one aspect, dataset 164 represents a container of application objects where protection attributes may be defined in terms of backup policy, replication profiles and retention policies. Dataset 164 is a basic unit that is used to manage backup operations. A user can add any permissible resource to the dataset from multiple host systems/applications.

The database access layer 174 saves information in the database 176. The database 176 may be used to store information that is discovered by the discovery module 150, policy information, host information, datasets and other information.

In one aspect, the database 176 may store various data structures for managing the storage services and providing status to users. As an example, the database schema for the database 176 is application format independent and may include various data structures to identify different host systems to specific login information, a backup metadata structure for storing information regarding backups, a data structure to map backups to stored objects including VMs, databases and others, a data structure for storing information on backup types, i.e. application consistent, full backup, copy backup, log backup for identifying volumes that are involved in each backup, a data structure to track various jobs that are managed by the job manager 182, discovery objects for storing information that is discovered by the discovery module 150, policy data structure 170, storage footprint and storage resource information, a data structure for storing information regarding various plugins, roles, role attributes, storage connections and user information, including credentials.

In one aspect, SAL 173 stores information regarding the various storage resources that are used and available for different hosts. SAL 173 maintains a "storage footprint" for different storage resources (for example, storage systems including storage devices) used by different applications as described below in detail.

In one aspect, HAL 175 is used to communicate with another plugin that is used to collect information related to storage used by different virtual machines.

Figure 1G:
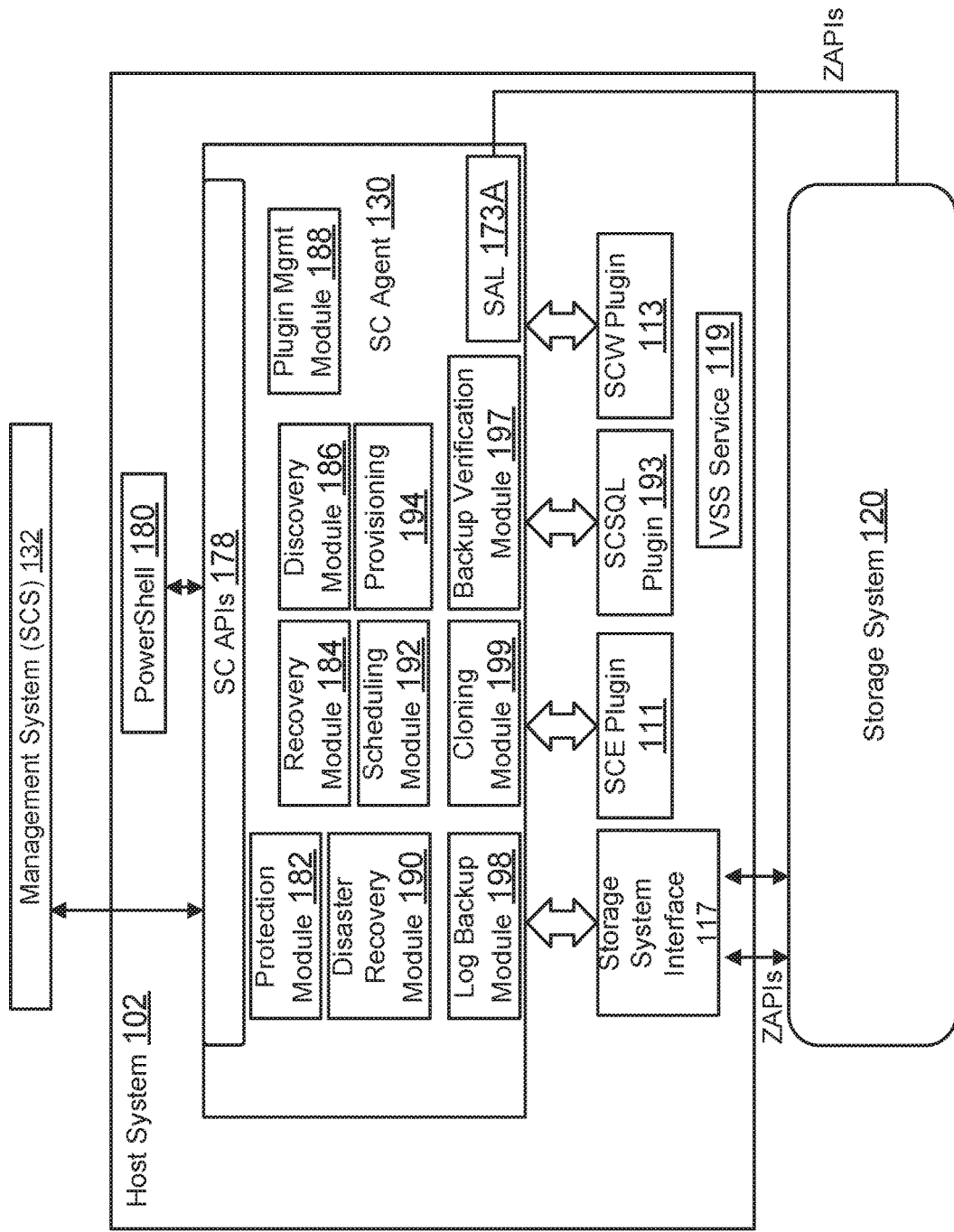
FIG. 1G shows a block diagram of an agent used by a computing system (or host system) for interfacing with a management module and other components' of FIG. 1A, according to one aspect of the present disclosure.

SC Agent 130: FIG. 1G shows an example of the SC agent 130 APIs (178) that can interface with SCS 132, according to one aspect. The SC agent 130 includes a protection module 182, a recovery module 184, a discovery module 186, a plugin management module 188, a disaster recovery module 190, a scheduling module 192, a provisioning module 194, a log backup module 198, a cloning module 199, a backup verification module 197 and SAL 173A.

SAL 173A may be used to communicate with the storage system 120. SAL 173A maintains a storage footprint for each application. SAL 173A interfaces with each plugin to obtain storage resources that are managed by storage system 120 and made available to different applications 126 (FIG. 1A). In one aspect, SAL 173A uses ZAPIs (Zephyr Application Programming Interface) to send and receive data from storage system 120.

In another aspect, the SC agent 130 interfaces with storage system 120 via the storage system interface 117. An example of storage system interface is SnapDrive provided by NetApp Inc. (with derogation of any trademark rights of NetApp Inc.).

The SC agent 130 interfaces with different types of plugins, for example, the SCE plugin 111, the SCW plugin 113, a SCSQL plugin 193, and others. The SCE plugin 111 is aware of Exchange format and behavior and provides Exchange specific information to a module of the SC agent 130. Similarly, the SQL plugin 193 understands a SQL database application and its objects and provides that information to the SC agent 130.

The backup verification module 197 verifies a backup or replication operation. Since different applications may have different requirements, the backup verification module 197 facilitates the verification for different applications.

The cloning module 199 assists in cloning a snapshot and a log backup module 198 assists in backing up logs. As an example, a database application may maintain a log to track changes to a database and the log backup module 198 assists in backing up those logs.

Figure 2A:
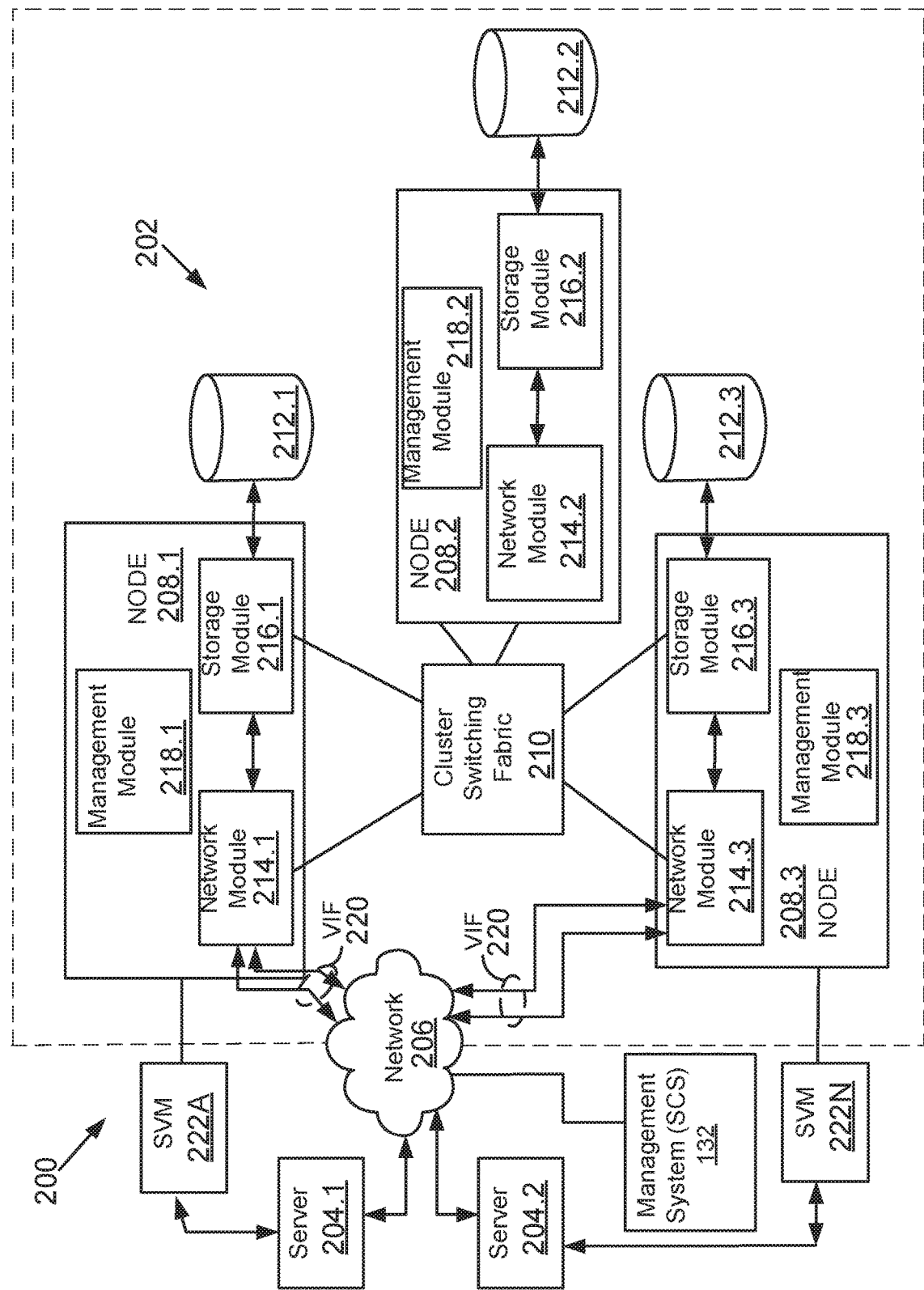
FIG. 2A shows an example of a cluster based storage system, used according to one aspect of the present disclosure.

Clustered Storage System: FIG. 2A depicts an illustrative aspect of a shared, storage environment 200, similar to storage system 120. The shared, storage environment 200 includes the management system 132 described above, a plurality of server systems 204.1-204.2 (similar to server systems 102), a clustered storage system 202 and at least one computer network 206 communicably connecting the server systems 204.1-204.2 and the clustered storage system 202.

The clustered storage system 202 includes a plurality of nodes 208.1-208.3, a cluster switching fabric 210, and a plurality of mass storage devices 212.1-212.3 (similar to 110, FIG. 1A). Each of the plurality of nodes 208.1-208.3 is configured to include a network module, a storage module, and a management module, each of which can be implemented as a separate processor executable or machine implemented module. Specifically, node 208.1 includes a network module 214.1, a storage module 216.1, and a management module 218.1, node 208.2 includes a network module 214.2, a storage module 216.2, and a management module 218.2, and node 208.3 includes a network module 214.3, a storage module 216.3, and a management module 218.3.

The network modules 214.1-214.3 include functionality that enables the respective nodes 208.1-208.3 to connect to one or more of the client systems 204.1-204.2 over the computer network 206, while the storage modules 216.1-216.3 connect to one or more of the storage devices 212.1-212.3.

The management modules 218.1-218.3 provide management functions for the clustered storage system 202. Accordingly, each of the plurality of server nodes 208.1-208.3 in the clustered storage server arrangement provides the functionality of a storage server.

A switched virtualization layer including a plurality of virtual interfaces (VIFs) 220 is provided below the interface between the respective network modules 214.1-214.3 and the client systems 204.1-204.2, allowing storage 212.1-212.3 associated with the nodes 208.1-208.3 to be presented to the client systems 204.1-204.2 as a single shared storage pool. For example, the switched virtualization layer may implement a virtual interface architecture. FIG. 2A depicts only the VIFs 220 at the interfaces to the network modules 214.1, 214.3 for clarity of illustration.

The clustered storage system 202 can be organized into any suitable number of virtual servers (VServer or storage virtual machines (SVM)) 222A-222N, in which each virtual storage system represents a single storage system namespace with separate network access. Each virtual storage system has a user domain and a security domain that are separate from the user and security domains of other virtual storage systems. Server systems 204 can access storage space via a VServer from any node of the clustered system 202.

Each of the nodes 208.1-208.3 may be defined as a computer adapted to provide application services to one or more of the client systems 204.1-204.2. In this context, a SVM is an instance of an application service provided to a client system. The nodes 208.1-208.3 are interconnected by the switching fabric 210, which, for example, may be embodied as a Gigabit Ethernet switch or any other switch type.

Although FIG. 2A depicts three network modules 214.1-214.3, the storage modules 216.1-216.3, and the management modules 218.1-218.3, any other suitable number of network modules, storage modules, and management modules may be provided. There may also be different numbers of network modules, storage modules, and/or management modules within the clustered storage system 202. For example, in alternative aspects, the clustered storage system 202 may include a plurality of network modules and a plurality of storage modules interconnected in a configuration that does not reflect a one-to-one correspondence between the network modules and storage modules.

The server systems 204.1-204.2 of FIG. 2A may be implemented as computing devices configured to interact with the respective nodes 208.1-208.3 in accordance with a client/server model of information delivery. In the presently disclosed aspect, the interaction between the server systems 204.1-204.2 and the nodes 208.1-208.3 enable the provision of network data storage services. Specifically, each server system 204.1, 204.2 may request the services of one of the respective nodes 208.1, 208.2, 208.3, and that node may return the results of the services requested by the client system by exchanging packets over the computer network 206, which may be wire-based, optical fiber, wireless, or any other suitable combination thereof. The server systems 204.1-204.2 may issue packets according to file-based access protocols, such as the NFS or CIFS protocol, when accessing information in the form of files and directories.

In a typical mode of operation, one of the server systems 204.1-204.2 transmits an NFS or CIFS request for data to one of the nodes 208.1-208.3 within the clustered storage system 202, and the VIF 220 associated with the respective node receives the client request. It is noted that each VIF 220 within the clustered system 202 is a network endpoint having an associated IP address. The server request typically includes a file handle for a data file stored in a specified volume on at storage 212.1-212.3.

Figure 2B:
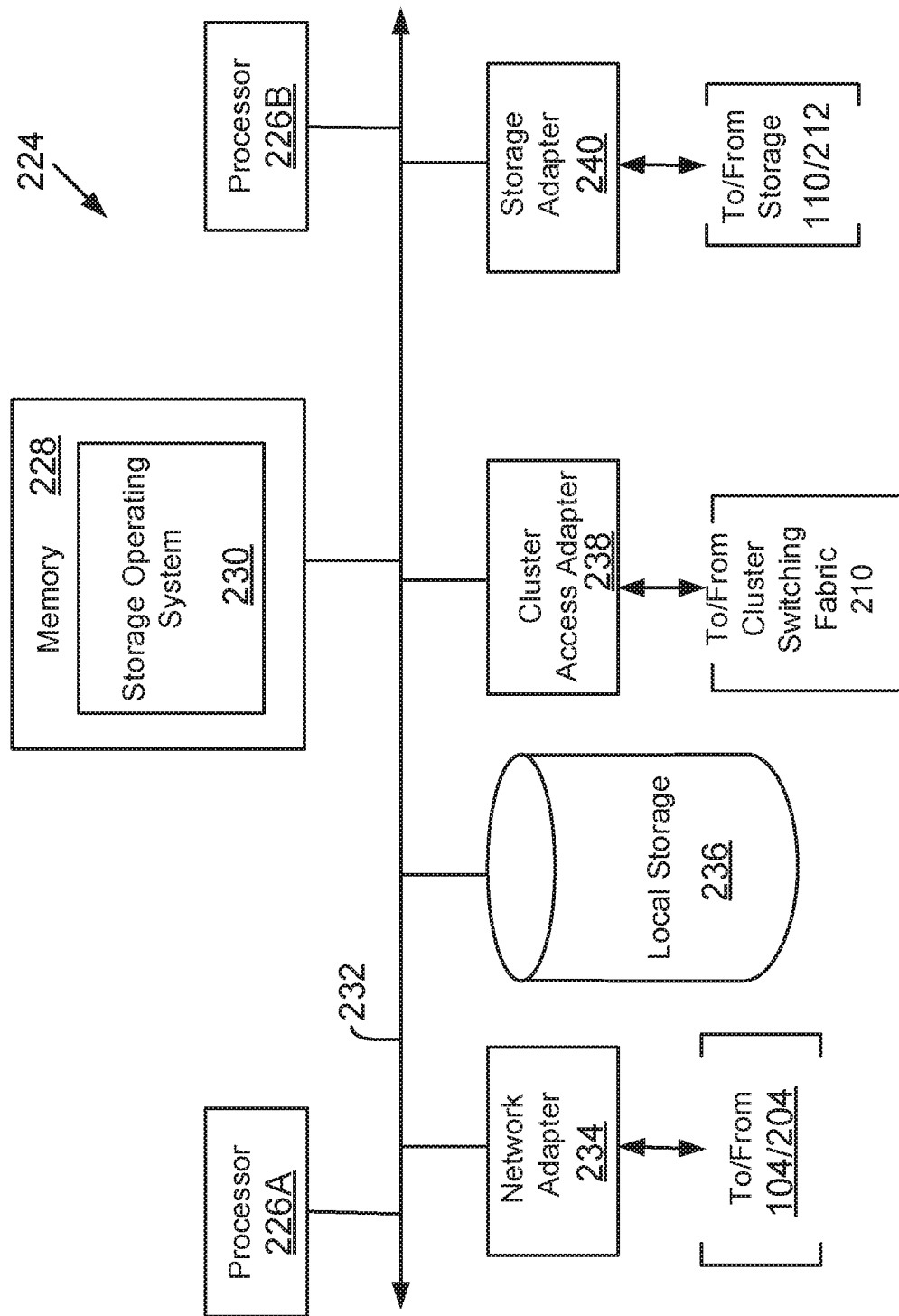
FIG. 2B shows an example of a storage system node, used according to one aspect of the present disclosure.

Storage System Node: FIG. 2B is a block diagram of a system 224, according to one aspect. System 224 may be used by a stand-alone storage system 120 and/or a storage system node operating within a clustered storage system node for performing various storage services described above. System 224 communicates with SAL 173A and/or storage system interface 117 for providing information regarding stored objects, backups, clones, restore operations and others as described above.

System 224 may include a plurality of processors 226A and 226B, a memory 228, a network adapter 234, a cluster access adapter 238 (used for a cluster environment), a storage adapter 240 and local storage 236 interconnected by a system bus 232. The local storage 236 comprises one or more storage devices, such as disks, utilized by the processors to locally store configuration and other information.

The cluster access adapter 238 comprises a plurality of ports adapted to couple system 224 to other nodes of a cluster as described above with respect to FIG. 2A. In the illustrative aspect, Ethernet may be used as the clustering protocol and interconnect media, although it will be apparent to those skilled in the art that other types of protocols and interconnects may be utilized within the cluster architecture described herein.

System 224 is illustratively embodied as a dual processor storage system executing a storage operating system 230 (similar to 124, FIG. 1A) that preferably implements a high-level module, such as a file system, to logically organize information as a hierarchical structure of named directories, files and special types of files called virtual disks (hereinafter generally "blocks") on storage devices 114/212. However, it will be apparent to those of ordinary skill in the art that the system 224 may alternatively comprise a single or more than two processor systems. Illustratively, one processor 226 executes the functions of a network module on a node, while the other processor 226B executes the functions of a storage module.

The memory 228 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions described herein.

The storage operating system 230, portions of which is typically resident in memory and executed by the processing elements, functionally organizes the system 224 by, inter alia, invoking storage operations in support of the storage service provided by storage system 120. An example of operating system 230 is the DATA ONTAP® (Registered trademark of NetApp, Inc. operating system available from NetApp, Inc. that implements a Write Anywhere File Layout (WAFL® (Registered trademark of NetApp, Inc.)) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this invention.

The network adapter 234 comprises a plurality of ports adapted to couple the system 224 to one or more server systems over point-to-point links, wide area networks, virtual private networks implemented over a public network (Internet) or a shared local area network. The network adapter 234 thus may comprise the mechanical, electrical and signaling circuitry needed to connect storage system 120 to the network. Illustratively, the computer network may be embodied as an Ethernet network or a FC network.

The storage adapter 240 cooperates with the storage operating system 230 executing on the system 224 to access information requested by SCS 132. The information may be stored on any type of attached array of writable storage device media such as video tape, optical, DVD, magnetic tape, bubble memory, electronic random access memory, flash memory devices, micro-electro mechanical and any other similar media adapted to store information, including data and parity information.

The storage adapter 240 comprises a plurality of ports having input/output (I/O) interface circuitry that couples to the disks over an I/O interconnect arrangement, such as a conventional high-performance, FC link topology.

In another aspect, instead of using a separate network and storage adapter, a converged adapter is used to process both network and storage traffic.

Figure 3:
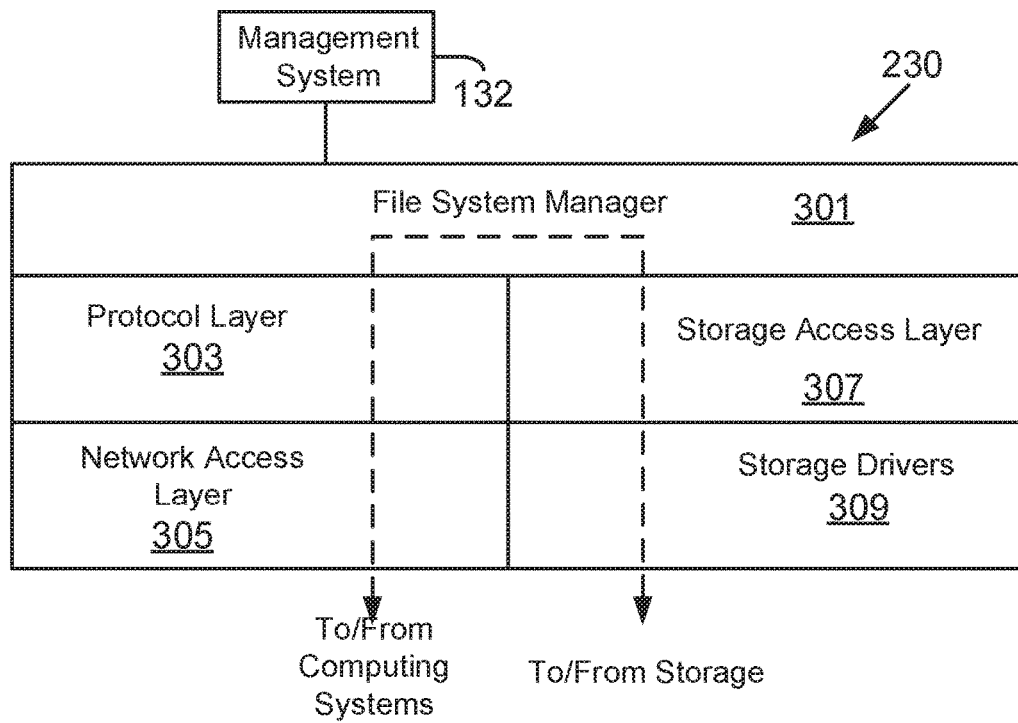
FIG. 3 shows an example of a storage operating system, used according to one aspect of the present disclosure.

Storage Operating System: FIG. 3 illustrates a generic example of storage operating system 230 (or 124) executed by storage system 120 and interfacing with the management system 132 and storage system interface 117/SAL 173A, according to one aspect of the present disclosure. The storage operating system 230 maintains various stored objects and data containers. Storage system interface 117 and/or SAL 173A communicates with different layers of storage operating system 230 for providing storage services in system 100 including backing up database 127 in DAG 125, described above in detail.

As an example, operating system 230 may include several modules, or "layers". These layers include a file system manager 303 that keeps track of a directory structure (hierarchy) of the data stored in storage devices and manages read/write operations, i.e. executes read/write operations on disks in response to server system 102 requests.

Operating system 230 may also include a protocol layer 303 and an associated network access layer 305, to allow system 200 to communicate over a network with other systems, such as server system 102 and management system 132. Protocol layer 303 may implement one or more of various higher-level network protocols, such as NFS, CIFS, Hypertext Transfer Protocol (HTTP), TCP/IP and others, as described below.

Network access layer 305 may include one or more drivers, which implement one or more lower-level protocols to communicate over the network, such as Ethernet. Interactions between server systems 102 and mass storage devices 114/212 are illustrated schematically as a path, which illustrates the flow of data through operating system 230.

The operating system 230 may also include a storage access layer 307 and an associated storage driver layer 309 to communicate with a storage device. The storage access layer 307 may implement a higher-level disk storage protocol, such as RAID (redundant array of inexpensive disks), while the storage driver layer 309 may implement a lower-level storage device access protocol, such as FC or SCSI.

It should be noted that the software "path" through the operating system layers described above needed to perform data storage access for a client request may alternatively be implemented in hardware. That is, in an alternate aspect of the disclosure, the storage access request data path may be implemented as logic circuitry embodied within a field programmable gate array (FPGA) or an ASIC. This type of hardware implementation increases the performance of the file service provided by storage system 120.

As used herein, the term "storage operating system" generally refers to the computer-executable code operable on a computer to perform a storage function that manages data access and may implement data access semantics of a general purpose operating system. The storage operating system can also be implemented as a microkernel, an application program operating over a general-purpose operating system, such as UNIX® or Windows®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a disk assembly directly-attached to a client or host computer. The term "storage system" should therefore be taken broadly to include such arrangements in addition to any subsystems configured to perform a storage function and associated with other equipment or systems.

Figure 4:
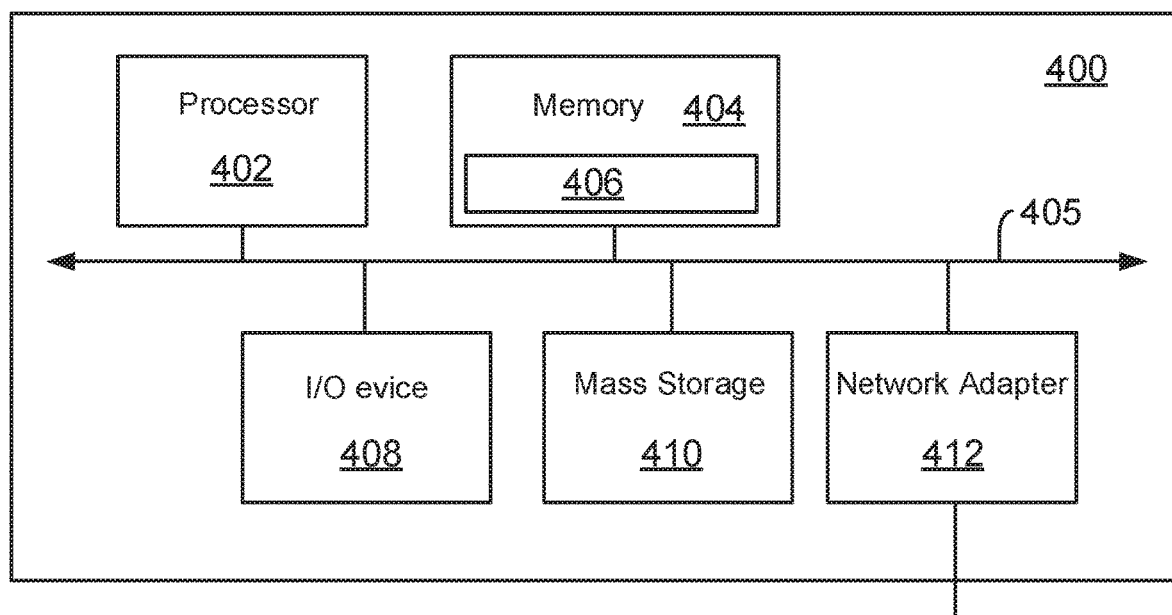
FIG. 4 shows an example of a processing system, used according to one aspect of the present disclosure.

Processing System: FIG. 4 is a high-level block diagram showing an example of the architecture of a processing system, at a high level, in which executable instructions as described above can be implemented. The processing system 400 can represent modules of SCS 132, host 102, and others. Note that certain standard and well-known components which are not germane to the present invention are not shown in FIG. 4.

The processing system 400 includes one or more processors 402 and memory 404, coupled to a bus system 405. The bus system 405 shown in FIG. 4 is an abstraction that represents any one or more separate physical buses and/or point-to-point connections, connected by appropriate bridges, adapters and/or controllers. The bus system 405, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 402 are the central processing units (CPUs) of the processing system 400 and, thus, control its overall operation. In certain aspects, the processors 402 accomplish this by executing programmable instructions stored in memory 404. A processor 402 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 404 represents any form of random access memory (RAM), read-only memory (ROM), flash memory, or the like, or a combination of such devices. Memory 404 includes the main memory of the processing system 400. Instructions 406 which implements techniques introduced above may reside in and may be executed (by processors 402) from memory 404. For example, instructions 406 may include code used for executing the process blocks of FIGS. 1D and 1E, SC agent 130, SC module 134 and the various plugins/applications.

Also connected to the processors 402 through the bus system 405 are one or more internal mass storage devices 410, and a network adapter 412. Internal mass storage devices 410 may be or may include any conventional medium for storing large volumes of data in a non-volatile manner, such as one or more magnetic or optical based disks. The network adapter 412 provides the processing system 400 with the ability to communicate with remote devices (e.g., storage servers) over a network and may be, for example, an Ethernet adapter, a FC adapter, or the like. The processing system 400 also includes one or more input/output (I/O) devices 408 coupled to the bus system 405. The I/O devices 408 may include, for example, a display device, a keyboard, a mouse, etc.

Cloud Computing: The system and techniques described above are applicable and especially useful in the cloud computing environment where storage is presented and shared across different platforms. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to a network, for example, the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer, is a cloud platform and cloud infrastructure, followed by a "server" layer that includes hardware and computer software designed for cloud specific services. The storage systems described above can be a part of the server layer for providing storage services. Details regarding these layers are not germane to the inventive aspects.

Thus, a method and apparatus for protecting databases in a DAG have been described. Note that references throughout this specification to "one aspect" or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the present disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising:
    initiating, by a second computing node, a backup operation to backup a passive database copy stored by the second computing node, the passive database copy corresponding to an active database copy stored by a first computing node, the passive database copy and the active database copy operating within a database availability group;
    requesting, by the second computing node, log information for the backup operation from the first computing node;
    receiving, by the second computing node, log backup metadata associated with a log backup taken by the first computing node, in response to the request from the second computing node;
    updating, by the second computing node, metadata for the backup operation to point a backup copy of the passive database copy to the second computing node indicating that the backup copy and the received log backup metadata is based on the passive database copy; and
    upon completion of the backup operation, enabling by the second computing node access to the passive database copy.

2. The method of claim 1, further comprising:
    indicating, by a policy object for the database availability group that the backup copy can be based on the passive database copy; and
    receiving, by the second computing node, a request for the backup operation based on the policy object.

3. The method of claim 1, further comprising:
    selecting the backup copy for a restore operation; and
    executing the restore operation by utilizing a database header associated with the backup operation to determine a log chain.

4. The method of claim 3, further comprising:
    updating the metadata for the backup copy to indicate current ownership of the active database copy.

5. The method of claim 1, further comprising:
    storing a single copy of the passive database copy within the database availability group at the second computing node.

6. The method of claim 1, further comprising:
    to complete the backup operation, using a plugin by the second computing node to interface with a database application.

7. The method of claim 1, further comprising:
to complete the backup operation, using a plugin by the second computing node to interface with a storage system that stores the backup copy.

8. A non-transitory, machine readable storage medium having stored thereon instructions for performing a method, comprising machine executable code which when executed by at least one machine, causes the machine to:
initiate a backup operation to backup a passive database copy stored by a second computing node, the passive database copy corresponding to an active database copy stored by a first computing node, the passive database copy and the active database copy operating within a database availability group;
request log information for the backup operation by the second computing node from the first computing node;
receive log backup metadata associated with a log backup at the second computing node, the log backup taken by the first computing node, in response to the request from the second computing node;
update metadata for the backup operation to point a backup copy of the passive database copy to the second computing node indicating that the backup copy and the received log backup metadata is based on the passive database copy; and
select the backup copy for a restore operation.

9. The non-transitory storage medium of claim 8, wherein upon completion of the backup operation, access to the passive database copy is enabled by the second computing node.

10. The non-transitory storage medium of claim 8, wherein a policy object for the database availability group indicates that the backup copy can be based on the passive database copy.

11. The non-transitory storage medium of claim 8, wherein to complete the backup operation, a plugin is used by the second computing node to interface with a database application.

12. The non-transitory storage medium of claim 8, wherein to complete the backup operation, a plugin is used by the second computing node to interface with a storage system that stores the backup copy.

13. The non-transitory storage medium of claim 8, wherein a single copy of the passive database copy is stored within the database availability group at the second computing node.

14. The non-transitory storage medium of claim 8, wherein the machine executable code further causes the machine: execute the restore operation by utilizing a database header associated with the backup operation to determine a log chain.

15. A system, comprising:
a second computing node storing a passive database copy corresponding to an active database copy stored by a first computing node, the second computing node having a memory containing machine readable medium comprising machine executable code having stored thereon instructions; and a processor coupled to the memory configured to execute the machine executable code to:
initiate a backup operation to backup the passive database copy, the passive database copy and the active database copy configured to operate within a database availability group;
request log information for the backup operation from the first computing node;
receive log backup metadata associated with a log backup, the log backup taken by the first computing node, in response to the request from the second computing node; and
update metadata for the backup operation to point a backup copy of the passive database copy to the second computing node indicating that the backup copy and the received log backup metadata is based on the passive database copy.

16. The system of claim 15, wherein the processor is further configured to execute the machine executable code to:
select the backup copy for a restore operation;
execute the restore operation by utilizing a database header associated with the backup operation to determine a log chain.

17. The system of claim 15, wherein a policy object for the database availability group indicates that the backup copy can be based on the passive database copy.

18. The system of claim 15, wherein to complete the backup operation, a plugin is used by the second computing node to interface with a database application.

19. The system of claim 15, wherein to complete the backup operation, a plugin is used by the second computing node to interface with a storage system that stores the backup copy.

20. The system of claim 15, wherein a single copy of the passive database copy is stored within the database availability group at the second computing node.

* * * * *